United States Patent [19]

Pichat

[11] Patent Number: 4,686,450
[45] Date of Patent: Aug. 11, 1987

[54] FLUID FLOW SENSOR

[75] Inventor: Alfred Pichat, Livingston, N.J.

[73] Assignee: General Signal Corporation, Stamford, Conn.

[21] Appl. No.: 848,074

[22] Filed: Apr. 4, 1986

[51] Int. Cl.⁴ .......................... G05F 1/46; G01F 1/68
[52] U.S. Cl. ................................. 323/282; 323/366; 323/907; 73/204; 340/606
[58] Field of Search .................... 323/280–282, 323/284, 294, 297–298, 365, 366, 369, 907; 73/204, 860.01, 860.02; 340/606, 660, 661

[56] References Cited

U.S. PATENT DOCUMENTS

| | | | |
|---|---|---|---|
| 3,233,109 | 2/1966 | Byles et al. | 73/204 |
| 3,258,760 | 6/1966 | Carlson et al. | 340/606 |
| 3,316,902 | 5/1967 | Winchel et al. | |
| 3,393,328 | 7/1968 | Meadows et al. | |
| 3,641,819 | 2/1972 | Kendrick | 340/606 X |
| 3,645,133 | 2/1972 | Simeth et al. | 73/204 |
| 3,650,151 | 3/1972 | Drexel | |
| 3,781,839 | 12/1973 | Bodge | 73/204 X |
| 3,989,486 | 11/1976 | Baysinger | 340/606 X |
| 3,992,940 | 11/1976 | Platzer, Jr. | 73/204 |
| 4,199,981 | 4/1980 | Young | 73/204 |
| 4,255,968 | 3/1981 | Harpster | 73/204 |
| 4,322,970 | 4/1982 | Peter | 73/204 X |
| 4,413,514 | 11/1983 | Bowman | 73/204 |
| 4,480,467 | 11/1984 | Harter et al. | 340/606 |
| 4,501,144 | 2/1985 | Higashi et al. | 73/204 |

FOREIGN PATENT DOCUMENTS

| | | | |
|---|---|---|---|
| 2456372 | 6/1975 | Fed. Rep. of Germany | 340/606 |
| 2444511 | 4/1976 | Fed. Rep. of Germany | 73/204 |
| 0034320 | 2/1983 | Japan | 73/204 |
| 1600988 | 10/1981 | United Kingdom | 340/606 |
| 0974275 | 11/1982 | U.S.S.R. | 73/204 |

*Primary Examiner*—Peter S. Wong
*Attorney, Agent, or Firm*—Robert R. Hubbard; Milton E. Kleinman

[57] ABSTRACT

A fluid flow sensor especially adapted for use in solid state electronic system. The sensor employs a heated thermistor in a first sensing network with a temperature compensation means, the two being connected in common to a sensor point. A second network includes a threshold adjusting means and a diode power supply fluctation circuit connected to a threshold point. The two networks are connected in a bridge circuit across a power supply. The thermistor responds to temperature changes associated with air flow changes to produce a change in circuit condition at the sensor point relative to the threshold point. A utility circuit responds to these changes in circuit condition to provide a desired response. The compensation network includes a plurality of diodes arranged to approximate the response of the heated thermistor to changes in power supply voltage such that the voltage at the threshold point closely tracks the voltage at the sensor point in response to any such changes. This minimizes the utility circuit responding to the changes in bridge circuit conditions caused by power supply fluctuations rather than by changes in air flow velocity.

2 Claims, 4 Drawing Figures

FLUID FLOW SENSOR

BACKGROUND OF THE INVENTION

This invention relates to a fluid flow sensor and, in particular, to a novel and improved fluid flow sensor that employs solid state components and is compatible with and for use in systems employing such solid state components.

Fluid flow sensors are useful in a variety of applications where it is desirable to detect and respond in some way to changes in fluid flow or velocity. These applications include flow monitoring of biological liquids in medical systems, oil, fuel or air in hydraulic and engine systems, air in electrical and electronic systems and the like.

The present invention, though of potential use in any such system is particularly useful in electronic systems. Electronic systems include one or more heat generating circuit components, usually mounted on printed circuit boards. To assure that the heat does not become great enough to damage the components or materially alter their operating characteristics and, hence, the response of the system, the system is designed to enhance air flow in and around the components. In many cases the air flow is maintained by a fan. An air flow sensor is positioned in the vicinty of the components (e.g., mounted on the printed circuit board) to detect and respond to changes in air flow (e.g., failure of the fan or blockage of air flow vents) to generate a signal indicative thereof for use by a utility circuit. The utility circuit, for example, might sound an alarm and/or turn the system off.

DESCRIPTION OF THE PRIOR ART

Prior art fluid flow sensors generally include a flow responsive device positioned in the fluid flow and connected in a bridge circuit. The flow responsive device is typically a temperature sensitive device such as a thermistor which responds to temperature changes associated with fluid flow changes to produce a change in circuit conditions in the bridge. The latter change is utilized in a utility circuit for the desired response, for instance, an alarm in the electronic system case. The fluid flow sensors disclosed in U.S. Pat. Nos. 3,992,940, 4,199,981, 4,322,970, 4,480,467 and 4,501,144 are typical prior art systems which employ such flow responsive devices in bridge circuits.

Prior art systems such as those disclosed in the aforementioned patents generally use regulated power supplies and/or circuitry interposed between the power supply and the bridge circuit for furnishing constant current flow to the bridge despite power supply fluctuations. Regulated power supplies and/or such circuitry are expensive and not cost justifiable in some applications.

SUMMARY OF THE INVENTION

An object of this invention is to provide a novel and improved fluid flow sensor which employs and is compatible with solid state components.

Another object of this invention is to provide a fluid flow sensor of the bridge circuit type in which means for compensating for power supply fluctuations is included directly in the bridge circuit.

A fluid flow sensor embodying the present invention includes a flow responsive device such as a thermistor positioned within the flow of the fluid. The thermistor is connected in a first sensing network with a temperature compensation means, the two being connected in common to a sensor point. A second network includes a threshold adjusting means for adjusting the threshold at a threshold point. The two networks are connected in bridge circuit across a power supply. The thermistor responds to temperature changes associated with fluid flow changes to produce a change in circuit condition at the sensor point relative to the threshold point. A utility circuit responds to these changes in circuit condition to provide a desired response. A voltage compensation circuit is connected in the second network between the power supply and the threshold point. The compensation network includes a plurality of diodes arranged to approximate the response of the thermistor to changes in power supply voltage such that the voltage at the threshold point closely tracks the voltage at the sensor point in response to any such changes in power supply voltage so as to minimize the utility circuit responding to changes in bridge circuit conditions caused by power supply fluctuations rather than by changes in fluid flow velocity.

BRIEF DESCRIPTION OF THE DRAWING

In the accompanying Drawing, like reference characters denote like elements of structure.

DESCRIPTION OF PREFERRED EMBODIMENT

It is contemplated that the fluid flow sensor of the present invention may be employed in any system in which it is desired to monitor or sense changes in the flow or velocity of a fluid. However, by way of example and completeness of description, a fluid flow sensor embodying the present invention is illustrated herein as an air flow sensor for an electrical or electronic system.

Figure 1:
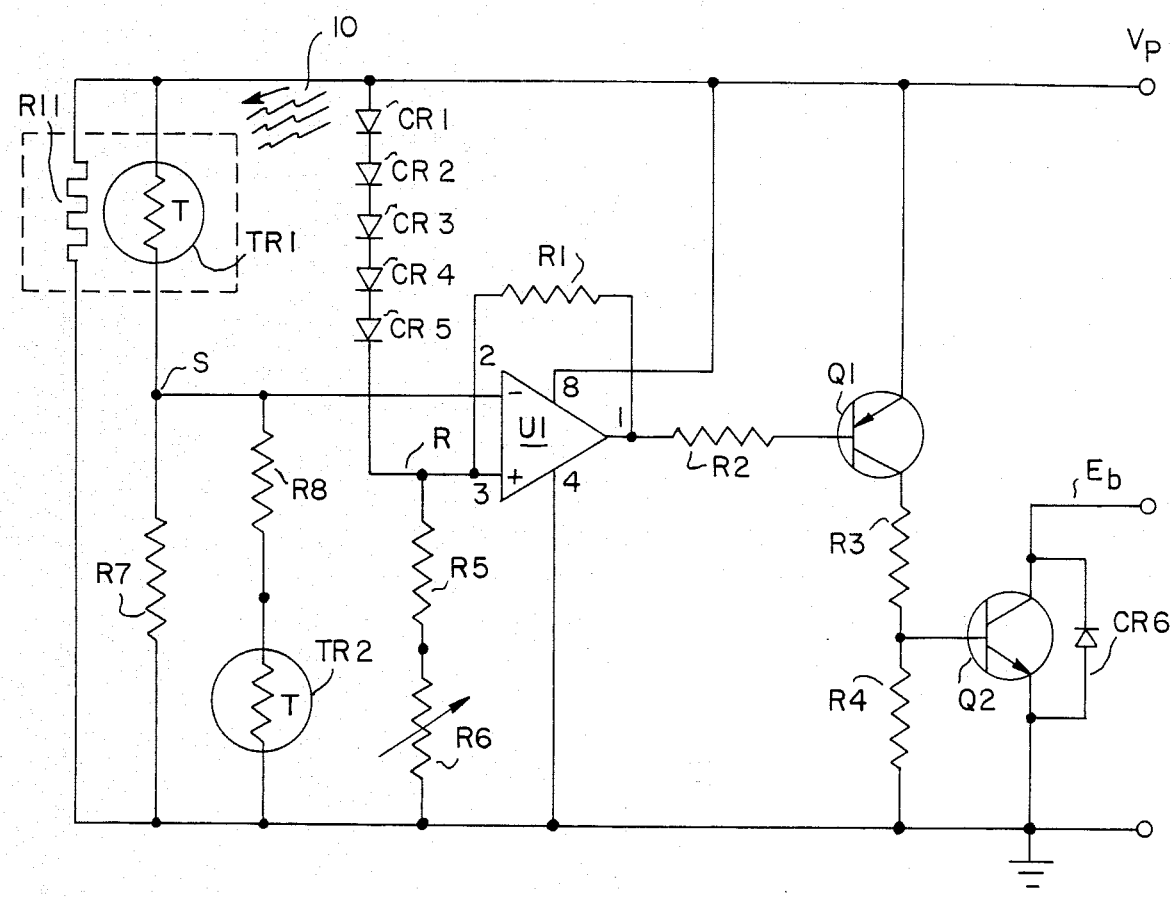
FIG. 1 is a circuit schematic of a fluid flow sensor embodying the present invention.

With reference to the schematic circuit diagram of FIG. 1, a fluid flow sensor embodying the invention includes a thermistor TR1. The thermistor is positioned in the vicinity of one or more electronic circuits (not shown) within a path of moving air (air flow) 10. For instance, the thermistor TR1 and the remaining components of FIG. 1 can all be mounted on a printed circuit board (not shown) that also carries the electronic circuits. Electronic circuits and printed circuit board do not form any part of the present invention and therefore are not illustrated.

Thermistor TR1 has an associated heater resistor R11 which serves to set a given thermal biasing by raising the temperature of the thermistor TR1, and therefore providing a given resistance at zero flow condition. This resistance will be proportional to flow rate or velocity, as it will affect its thermal losses. Also associated with thermistor TR1 is a temperature compensation network consisting of resistors R7, R8 and a second thermistor TR2. Thermistor TR2 and the values of resistors R7 and R8 are chosen such that thermistor TR2 responds to changes in ambient temperature similarly to the manner in which thermistor TR1 so responds to thereby provide a temperature compensation. The compensation is achieved with respect to the sensing point S to which resistors R7 and R8 and thermistor TR1 are connected in common. This together with heater resistor R11 forms a first sensing network in one leg of a bridge circuit.

The other leg of the bridge circuit consists of a second network which includes a threshold adjustment means to adjust the threshold at a threshold or reference point R. The threshold adjustment means includes resistors R5 and R6. Resistor R6 is a variable resistor to provide the adjustment function.

Also included in the second network is a plurality of diodes CR1, CR2, CR3, CR4 and CR5 arranged to provide a voltage compensation circuit which approximates the response of the thermistor TR1 to changes in the power supply $V_P$. This allows the reference point to very closely track the sensing point in response to any such changes. To this end diodes CR1-CR5 are connected in series and to the reference point R.

The first and second networks (two legs of the bridge) are connected across a power supply, designated in FIG. 1 by the symbol $V_P$ at one terminal and by the conventional circuit ground symbol at its other terminal. A utility circuit is connected across the points S and R so as to respond to changes in circuit conditions at the point S relative to the point R as occasioned by changes circuit consists of a voltage comparator U1 having the S point connecting to its −input and the reference point R connected to its +input. A feedback resistor R1 is connected between the output of the comparator U1 and its +input so as to provide hyteresis. The output of the voltage comparator is coupled by the way of a resistor R2 to the base of a transistor Q1. The transistor Q1 has its emitter connected to the power supply $V_P$ and its collector to circuit ground by way of series connected resistors R3 and R4. The junction of resistors R3 and R4 is connected to the base of a further transistor Q2. Transistor Q2 is connected in an open collector configuration. To this end, transistor Q2 has its emitter connected to circuit ground and a diode CR6 connected between its emitter and collector leads. The circuit output signal is taken from the collector lead of transistor Q2.

The circuit operates in response to air stream changes in the following manner. When the velocity of the air stream in which thermistor TR1 is positioned is normal and acting to move the heat generated by the electronic circuitry to be protected by convection, the voltage at the sensing points will be either within the hyteresis region of the voltage comparator U1 or below the voltage at the reference point R. The output of the comparator U1 will then be at a high level and the output transistors Q1 and Q2 will be in an off condition. When the air velocity decreases to a level below the desired sensing point, the voltage at the sensing points will rise higher than the voltage at the reference point R. The output of the operational amplifier U1 will now switch to a low level. When this happens, transistors Q1 and Q2 will turn on providing an open collector output which can be used to drive any desired signalling device such as an alarm.

An important feature of this invention is the use of the diodes CR1-CR5 as a power supply voltage compensation network. The response of the diodes to power supply fluctuations nearly matches the response of the heater resistor R11 and thermistor TR1 response so that the voltage at the reference point R very closely tracks the voltage at the sensing point S.

Figure 2:
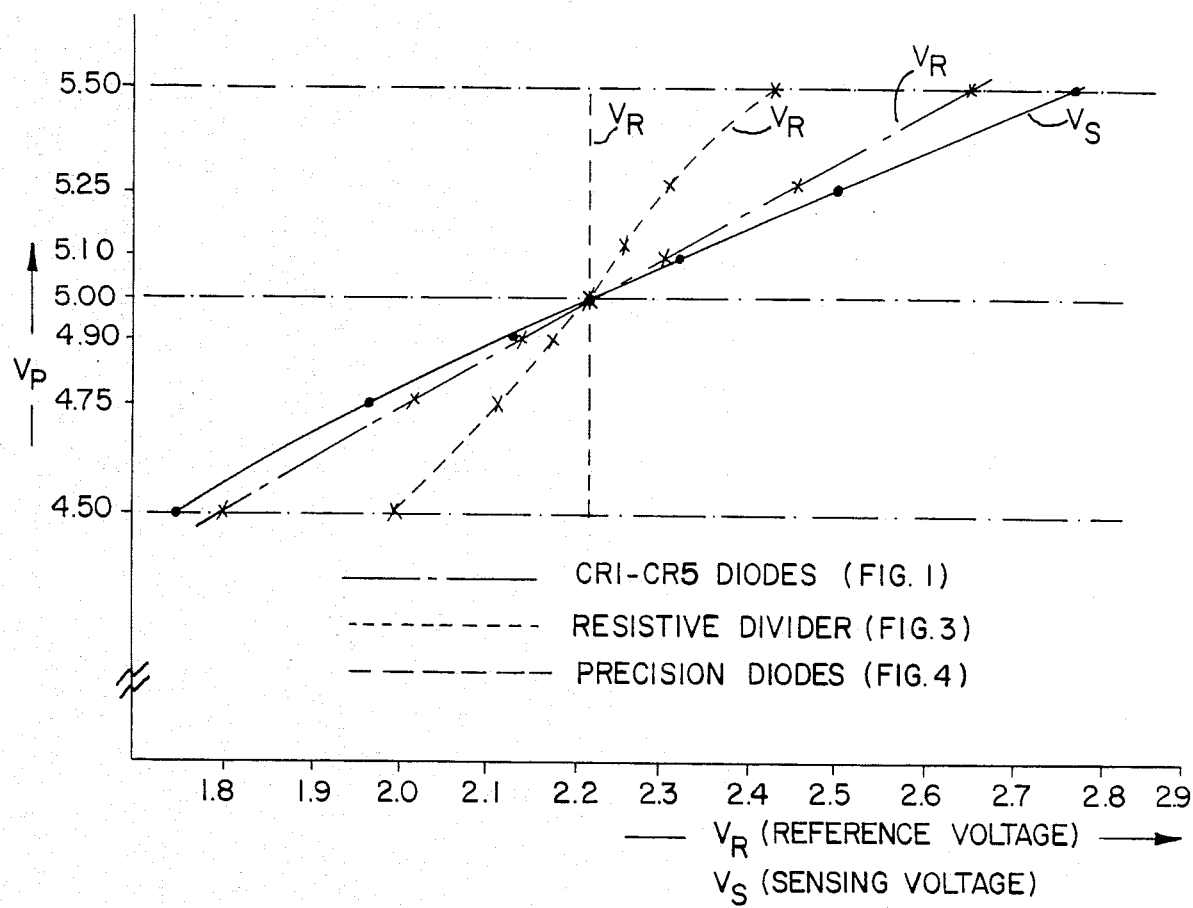
FIG. 2 is a graph illustrating the effect of power supply variation upon the reference voltage $V_R$ relative to the sensing voltage $V_S$ to the circuits of FIGS. 1, 3 and 4.
Figure 3:
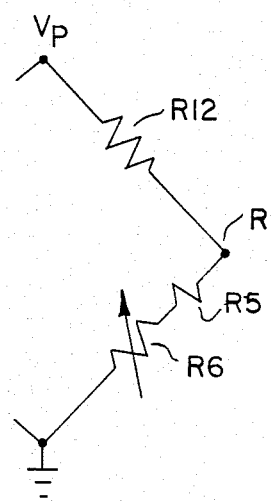
FIG. 3 is a partial circuit diagram of a test circuit identical to the FIG. 1 circuit except that the diode compensation circuit is replaced by a resistive circuit.
Figure 4:
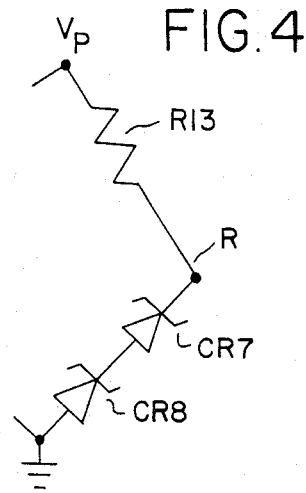
FIG. 4 is a partial circuit diagram for another test circuit identical to the FIG. 1 circuit except that the diode voltage compensation network and the threshold adjustment network are replaced by a resistive network and a precision voltage reference diode network.

This is illustrated graphically in FIG. 2 which is a plot of power supply voltage $V_P$ on the ordinate and reference voltage $V_R$ and sensing voltage $V_S$ on the abscissa. This plot is based on actual data taken for different values of a five volts power supply with a ±10% tolerance (4.5-5.5 volts). The plot consists of three different $V_R$ curves. The long dash, short dash, long dash curve represents $V_R$ for the FIG. 1 circuit including the diode compensation network. The dotted curve represents $V_R$ for a circuit identical to the FIG. 1 circuit except that the diodes CR1-CR5 are replaced by a resistor R12 as shown in FIG. 3. The dashed curve represents $V_R$ for a circuit identical to the FIG. 1 circuit except that the diodes CR1-CR5 are replaced by a resistor R13 and the threshold adjusting resistors are R5 and R6 are replaced by a pair of series connected precision reference diodes (1.23 volts each) as illustrated in FIG. 4.

The plot shows that the sensing voltage $V_S$ changes substantially linearly with the power supply over the one volt range. The reference voltage $V_R$ for the FIG. 2 circuit with the diode compensation network, though not linear over this range, very closely approximates $V_S$. This should be compared to the other two cases of the resistive divider (FIG. 3) and the precision reference diodes (FIG. 4). For the precision diode case, $V_R$ is essentially clamped at approximately 2.2375 volts above circuit ground throughout the entire one volt range. That is, there is substantially no tracking of the $V_R$ reference voltage with the $V_S$ sensing voltage in response to power supply fluctuations. The resistive divider case is an improvement over the precision diode case, but its value as a voltage compensation network is questionable. As can be seen the $V_R$ plot for the resistive divider case rapidly diverges from the $V_S$ response as the power supply deviates from the five volts value.

In one design embodying the invention, the FIG. 1 fluid flow circuit employed the following components:

| Component | Type or Value |
| --- | --- |
| Thermistor TR1 | 20 kilohms NTC at 25° C. |
| Thermistor TR2 | 10 kilohms NTC at 25° C. |
| Diodes CR1-CR6 | 1N914 |
| Transistor Q1 | 2N2907 |
| Transistor Q2 | 2N2222 |
| Voltage Comparator | LM393 |
| Resistor R1 | 1 megohm |
| Resistor R2 | 3.3 kilohms |
| Resistor R3 | 330 hms |
| Resistor R4 | 220 ohms |
| Resistor R5 | 330 ohms to 20 kilohms |
| Resistor R6 | 10 kilohm potentiometer |
| Resistor R7 | 4.7 to 15 kilohms |
| Resistor R8 | 0 to 1 kilohms |
| Resistor R11 | 51 ohms |

Although a preferred emobodiment of the invention has been shown in the drawings, it is to be understood that the disclosures is for the purpose of illustration only and that various changes in circuit connections and component value will be desirable from one design and/or application to another without departing from the spirit and scope of the invention as set forth in the appended claims.

What is claimed is:

1. A fluid flow sensor having a first sensing network including a thermistor and temperature compensation means connected in common to a sensor point, a second network including threshold adjustment means for adjusting the threshold at a threshold point, the two networks being connected across a power supply and means coupled to the two points and operative to generate an output signal that changes in value in response to the conditions in which the voltage at the sensor point (a) rises above and (b) falls below the voltage at the threshold point; the improvement comprising:

a voltage compensation circuit connected in the second network between the power supply and the threshold point and including a plurality of diodes arrange to approximate the response of the thermistor to changes in power supply voltage such that the voltage at the threshold point closely tracks the voltage at the sensor point in response to any such changes in power supply voltage.

2. An fluid flow sensor in accordance with claim 1 wherein the diodes are connected in series between the power supply and the threshold point.

* * * * *